(12) United States Patent
Inada et al.

(10) Patent No.: US 10,149,096 B2
(45) Date of Patent: Dec. 4, 2018

(54) WIRELESS DEVICE AND COMMUNICATION METHOD FOR COMMUNICATING WITH RELAY STATION

(71) Applicant: JVC KENWOOD Corporation, Yokohama-shi, Kanagawa (JP)

(72) Inventors: Makoto Inada, Yokohama (JP);
Hiroyuki Nakajima, Yokohama (JP);
Kazuki Mannami, Yokohama (JP);
Shimpei Kamaya, Yokohama (JP);
Yasuma Suzuki, Yokohama (JP);
Atsushi Saito, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/646,198

(22) Filed: Jul. 11, 2017

(65) Prior Publication Data

US 2018/0020325 A1    Jan. 18, 2018

(30) Foreign Application Priority Data

Jul. 12, 2016    (JP) .................................. 2016-137446

(51) Int. Cl.
*H04W 4/02*    (2018.01)
*H04W 4/021*    (2018.01)
*H04B 7/14*    (2006.01)

(52) U.S. Cl.
CPC .............. *H04W 4/021* (2013.01); *H04B 7/14* (2013.01)

(58) Field of Classification Search
CPC .............................. H04B 7/14; H04W 72/044
See application file for complete search history.

(56) References Cited

U.S. PATENT DOCUMENTS

| | | | |
|---|---|---|---|
| 2012/0329476 A1* | 12/2012 | Tenny | .................... H04W 64/00 455/456.1 |
| 2015/0053144 A1* | 2/2015 | Bianchi | ................ A01K 27/001 119/720 |
| 2017/0086425 A1* | 3/2017 | Bianchi | ................ A01K 27/001 |
| 2017/0325225 A1* | 11/2017 | Dinan | ............... H04W 72/0446 |

FOREIGN PATENT DOCUMENTS

JP    2015-185966 A    10/2015

* cited by examiner

*Primary Examiner* — Diane Mizrahi
(74) *Attorney, Agent, or Firm* — Brundidge & Stanger, P.C.

(57) ABSTRACT

A transmission unit transmits a signal to a relay station. A reception unit receives a signal from the relay station if the transmission unit does not transmit a signal. A control unit determines whether to (1) perform continuous transmission by the transmission unit or (2) perform communication in which transmission by the transmission unit and reception by the reception unit are alternately switched, based on the positional information acquired in the positional information acquisition unit and the communication area information acquired in the communication area information acquisition unit.

10 Claims, 11 Drawing Sheets

FIG. 3

| START SIGNAL | TRANSMISSION SOURCE IDENTIFIER | CONVERSION SIGNAL | END SIGNAL |
|---|---|---|---|

WIRELESS DEVICE AND COMMUNICATION METHOD FOR COMMUNICATING WITH RELAY STATION

CROSS-REFERENCE TO RELATED APPLICATION

This application is based upon and claims the benefit of priority from the prior Japanese Patent Application No. 2016-137446, filed on Jul. 12, 2016, the entire contents of which are incorporated herein by reference.

BACKGROUND

1. Field

The present invention relates to wireless technologies and, more particularly, to wireless devices and communication methods for communicating with relay stations.

2. Description of the Related Art

Those of mobile wireless devices provided with a speaker and microphone for performing speech communication that are directed to business purposes are configured to transmit a speech signal when the user manipulates a Push To Talk (PTT) switch. Meanwhile, the mobile wireless device receives a speech signal while the user is not manipulating the PTT switch (e.g., patent document 1).

[patent document 1] JP2015-185966

As a wireless apparatus configured as a mobile wireless device like this moves out of a communication area formed by the relay station, the intensity of a signal to and from the relay station drops so that a phone call may be disrupted. Meanwhile, wireless devices adapted for half-duplex FDMA communication cannot receive signals during transmission and so are unable to acquire the intensity of signals from the relay station when the device moves out of the coverage area during transmission. This prevents the device from recognizing that the device is outside the coverage area. As a result, a speech may not be received even if the user of the wireless device believes that the speech is transmitted.

SUMMARY

To address the aforementioned issue, the wireless device according to an embodiment comprises: a positional information acquisition unit that acquires positional information indicating a position of the wireless device; a communication area information acquisition unit that acquires communication area information indicating a communication area of a relay station; a transmission unit that transmits a signal to the relay station; a reception unit that receives a signal from the relay station if the transmission unit does not transmit a signal; and a control unit that determines whether to (1) perform continuous transmission by the transmission unit or (2) perform communication in which transmission by the transmission unit and reception by the reception unit are alternately switched, based on the positional information acquired in the positional information acquisition unit and the communication area information acquired in the communication area information acquisition unit.

Another embodiment relates to a communication method. The method is implemented in a wireless device and comprises: acquiring positional information indicating a position of the wireless device; acquires communication area information indicating a communication area of a relay station; transmitting a signal to the relay station; receiving a signal from the relay station if the signal is not transmitted from the wireless device; and determining whether to (1) perform continuous transmission or (2) perform communication in which transmission and reception are alternately switched, based on the positional information and the communication area information.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 3 shows a format of a signal used in the wireless device of FIG. 2;

DETAILED DESCRIPTION

Figure 1:
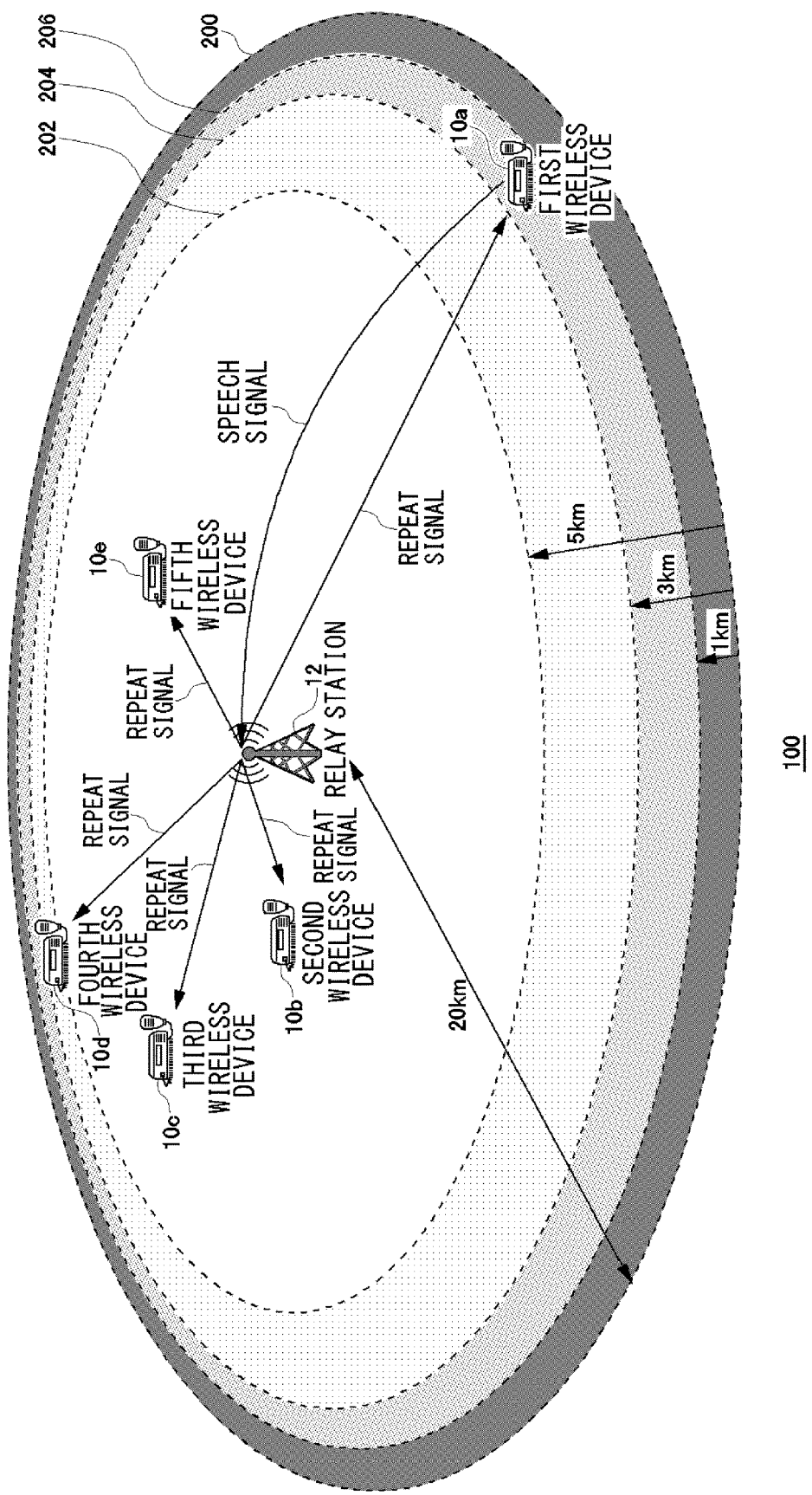
FIG. 1 shows features of a communication system according to Embodiment.

The invention will now be described by reference to the preferred embodiments. This does not intend to limit the scope of the present invention, but to exemplify the invention.

Embodiment 1

A summary will be given before describing the invention in specific details. Embodiment 1 relates to a wireless device of half duplex communication scheme adapted to communicate a speech using PTT. Transmission of a speech is started by pressing a PTT button and terminated by releasing the PTT button. The speech is received while the PTT button is not being pressed. When a wireless device transmits a signal to transmit a speech, a relay station receives the signal. The relay station transmits the received signal to devices around. The other wireless devices receive the signal from the relay station (hereinafter, referred to as "repeat signal"). The represents reception of speech. In essence, a plurality of wireless devices communicate with each other via the relay station. Therefore, the wireless devices should be located in a range in which it is possible to communicate with the relay station (hereinafter, "communication enabled area"). Generally, the wireless device determines that the device is located in the communication enabled area, i.e., the coverage area, if the intensity of the repeat signal etc. from the relay station is higher than a threshold value. Otherwise, the wireless device determines that the device is outside the communication enabled area, i.e., the coverage area. For brevity of the description, it will be assumed below that it is determined that the device is in the coverage area if the repeat signal is received and that the device is outside the coverage area if the repeat signal is not received.

It will be assumed now that the wireless device in which the PTT button remains pressed moves out of the communication enabled area. This represents movement of the wireless device transmitting a speech out of the coverage area from inside the coverage area. The wireless device transmitting a speech continues to transmit a signal and does not receive a signal from the relay station and so cannot determine whether the device is inside or outside the coverage area. Therefore, the user continues to transmit a speech when the device moves out of the coverage area but the signal from the wireless device transmitting the speech is not received by the relay station. This prevents phone calls from taking place. It is therefore required to determine whether the device is inside or outside the coverage area even in the wireless device transmitting a speech.

The wireless device according to this embodiment identifies its position by using a Global Positioning System (GPS) and also maintains communication area information indicating an estimated communication enabled area (hereinafter, "communication area") of the relay station. The wireless device transmitting a speech detects whether the wireless device is located in the neighborhood of the border of the communication area in the communication area or located on the inner side thereof, by referring to the positional information identified and the communication area information. If the latter is the case, the wireless device performs continuous transmission performed so far. Meanwhile, if the former is the case, the wireless device alternately switches between transmission and reception. This represents intermittent transmission. The wireless device determines that the device is located in the coverage area if the device receives a repeat signal in a period for reception. If a repeat signal is not received, it is determined that the device is outside the coverage area.

FIG. 1 shows features of a communication system 100 according to Embodiment 1. The communication system 100 includes a first wireless device 10a, a second wireless device 10b, a third wireless device 10c, a fourth wireless device 10d, and a fifth wireless device 10e, which are generically referred to as wireless devices 10, and a relay station 12. The communication system 100 is compatible with, for example, business wireless communication.

The wireless device 10 is capable of performing business wireless communication. A publicly known technology may be used for business wireless communication so that a description thereof is omitted. In business wireless communication, a plurality of wireless devices 10 form a group. The first wireless device 10a corresponds to the transmitting end of speech communication in business wireless communication and the second wireless device 10b through the fifth wireless device 10e correspond to the receiving end of speech communication in business wireless communication. For this reason, the first wireless device 10a is used by the transmitter in communication and the second wireless device 10b through the fifth wireless device 10e are used by the receiver of the speech. The number of wireless devices 10 may not be limited to "5."

The relay station 12 is compatible with business wireless communication and is connected to a plurality of wireless devices 10. The relay station 12 relays signals for the plurality of wireless devices 10 in a group. In this process, the relay station 12 assigns an upstream channel and a downstream channel to the group. For example, the relay station 12 receives a signal (hereinafter, referred to as "speech signal") transmitted from the first wireless device 10a using the upstream channel and transmits the speech signal as a repeat signal using the downstream channel. Transmission in the relay station 12 is broadcasting so that the repeat signal is transmitted to the first wireless device 10a through the fifth wireless device 10e and received by the first wireless device 10a through the fifth wireless device 10e.

The range in which it is estimated to be possible to communicate with the relay station 12 is indicated as a communication area 200. It is assumed here that the communication area 200 is formed as a circle having a radius of 20 km around the position where the relay station 12 is placed. The communication area 200 may be formed in a shape other than a circle depending on the geography around the relay station 12. The communication enabled area in which it is actually possible to communicate with the relay station 12 may differ from the communication area 200 depending on the geography, buildings, conditions of radio waves, etc. in the area. In essence, communication may not be enabled in some locations in the communication area 200, and communication may be enabled in some locations outside the communication area 200. A first boundary line 202, a second boundary line 204, a third boundary line 206 are defined in the communication area 200. The first boundary line 202 is a circular arc interior to the border of the communication area 200 and reduced in size in the direction toward the center by 5 km, and the second boundary line 204 is a circular arc interior to the border of the communication area 200 and reduced in size in the direction toward the center by 3 km. Further, the third boundary line 206 is a circular arc interior to the border of the communication area 200 and reduced in the direction toward the center by 1 km. Therefore, the first boundary line 202 is closest to the center of the communication area 200, followed by the second boundary line 204. The third boundary line 206 is the farthest.

Basically, as the distance from the position of the relay station is increased, the intensity of a repeat signal etc. from the relay station is decreased monotonously. The closer a spot in the communication area 200 is to the border of the communication area 200, the smaller the intensity of a repeat signal etc. and the higher the probability of the wireless device not being able to receive a repeat signal etc. actually due to an impact from the geography or buildings. In essence, the probability of the wireless device not being able to receive a repeat signal etc. actually is increased in the ascending order of a spot on the first boundary line 202, a spot on the second boundary line 204, and a spot on the third boundary line 206. The first boundary line 202 is defined as a boundary for which the probability of the wireless device not being able to receive a repeat signal etc. from the relay station need not be considered at spots on the inner side of the boundary line, in light of the (smallness of the) probability of the wireless device not being able to receive a repeat signal etc. actually. In Embodiment 1, the first boundary line 202 is used in the description, but the second boundary line 204 and the third boundary line 206 are not used in the description.

If the first wireless device 10a transmits a speech signal in the communication enabled area of the relay station 12, the speech signal is received by the relay station 12. Meanwhile, if the first wireless device 10a moves out of the communication enabled area and transmits a speech signal, the speech signal is not received by the relay station 12. This prevents the relay station 12 from transmitting a repeat signal, preventing phone calls between the first wireless device 10a and the other wireless devices 10 from taking place. The first wireless device 10a does not receive a repeat signal from the relay station 12 during transmission and so cannot determine whether the first wireless device 10a is located in the communication enabled area or outside the communication enabled area.

In order to prevent this, the first wireless device 10a performs intermittent transmission when the first wireless device 10a is located outside the first boundary line 202 in the communication enabled area. In intermittent transmission, a transmission process and a reception process are repeated in a time-divided manner. It will be assumed here that the first wireless device 10a switches between a transmission process and a reception process ideally and the time required for switching is negligible. In a reception mode during intermittent transmission, the first wireless device 10a attempts to receive a repeat signal for the speech signal that the first wireless device 10a transmitted itself. If the repeat signal is received, the first wireless device 10a determines that the first wireless device 10a is located in the communication enabled area. If the repeat signal is not received, the first wireless device 10a determines that the first wireless device 10a is located outside the communication enabled area.

Figure 2:
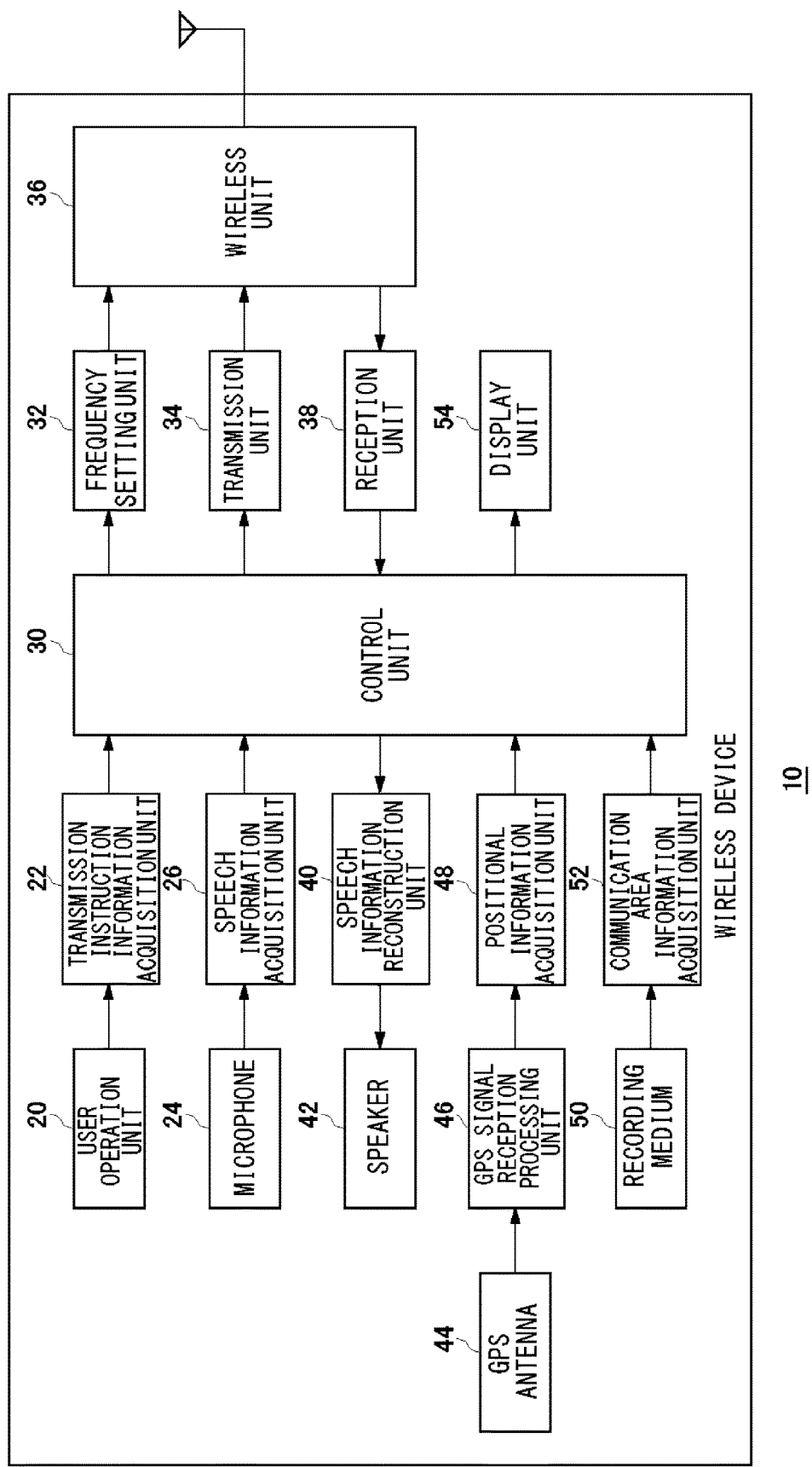
FIG. 2 shows features of the wireless device of FIG. 1.

FIG. 2 shows features of the wireless device 10. The wireless device 10 includes a user operation unit 20, a transmission instruction information acquisition unit 22, a microphone 24, a speech information acquisition unit 26, a control unit 30, a frequency setting unit 32, a transmission unit 34, a wireless unit 36, a reception unit 38, a speech information reconstruction unit 40, a speaker 42, a GPS antenna 44, a GPS signal reception processing unit 46, a positional information acquisition unit 48, a recording medium 50, a communication area information acquisition unit 52, and a display unit 54. The description will be given in the order of (1) transmission process, (2) reception process, and (3) covered/uncovered determination process.

(1) Transmission Process

The user operation unit 20 corresponds to a PTT button and is pressed by the user to transmit a speech using PTT. The speech continues to be transmitted while the user operation unit 20 is being pressed. Pressing of the user operation unit 20 is equivalent to receiving an instruction to transmit a speech signal. The user operation unit 20 continues to output transmission instruction information indicating a transmission instruction to the transmission instruction information acquisition unit 22 while the user operation unit 20 is being pressed. Upon acquiring the transmission instruction information from the user operation unit 20, the transmission instruction information acquisition unit 22 outputs the transmission instruction information to the control unit 30.

The microphone 24 collects the speech of the user. The microphone 24 converts the collected speech into an electrical signal (hereinafter, "conversion signal") and outputs the conversion signal to the speech information acquisition unit 26. The speech information acquisition unit 26 receives the conversion signal from the microphone 24. The speech information acquisition unit 26 converts the analog conversion signal into a digital signal and outputs the digital conversion signal (hereinafter, also referred to as "conversion signal") to the control unit 30.

Upon receiving the transmission instruction information from the transmission instruction information acquisition unit 22, the control unit 30 outputs the conversion signal input from the speech information acquisition unit 26 to the transmission unit 34. In this process, the control unit 30 instructs the frequency setting unit 32 to set an upstream channel frequency. Upon receiving the instruction from the control unit 30, the frequency setting unit 32 sets the frequency of the wireless unit 36 to the upstream channel frequency. If the instruction from the control unit 30 is not received, i.e., if the user operation unit 20 is not pressed, the frequency setting unit 32 sets the frequency of the wireless unit 36 to the downstream channel frequency. The upstream channel frequency and the downstream channel frequency are different.

The transmission unit 34 receives the conversion signal from the control unit 30. The transmission unit 34 stores the conversion signal in the speech signal and codes and demodulates the speech signal. The result of the process will also be referred to as "speech signal." FIG. 3 shows a format of a signal used in the wireless device 10. The format shown represents a format of a speech signal. As illustrated, a start signal, a transmission source identifier, a conversion signal, and an end signal are arranged. The start signal is a signal indicating the start of the speech signal, and the end signal is a signal indicating the end of the speech signal. A publicly known technology may be used for the start signal and the end signal so that a description thereof is omitted. The start signal may include a preamble. The transmission source identifier identifies the wireless device 10 originating the speech signal. Information other than the transmission source identifier and the conversion signal may be included between the start signal and the end signal. Reference is made back to FIG. 2. The transmission unit 34 outputs the speech signal to the wireless unit 36.

The wireless unit 36 receives the sound signal from the transmission unit 34. The wireless unit 36 subjects the speech signal to frequency conversion, amplification, etc. In this process, the upstream channel frequency targeted in frequency conversion is set by the frequency setting unit 32. The wireless unit 36 transmits the result of the process (hereinafter, also referred to as "speech signal") to the relay station 12 via the antenna.

(2) Reception Process

While a speech signal is not transmitted, the frequency of the wireless unit 36 is set by the frequency setting unit 32 to the downstream channel frequency. In this mode, the wireless unit 36 receives a repeat signal from the relay station 12. The wireless unit 36 subjects the repeat signal to amplification, frequency conversion, etc. The wireless unit 36 outputs the result of the process (also referred to as "repeat signal") to the reception unit 38.

The reception unit 38 receives the repeat signal from the wireless unit 36. The reception unit 38 subjects the repeat signal to demodulation, decoding, etc. The format of the result of the process (hereinafter, also referred to as "repeat signal") is as shown in FIG. 3. In this process, an identifier for identifying the wireless device 10 transmitting the speech signal that originates the repeat signal is entered as the transmission source identifier. Thus, the reception unit 38 receives the repeat signal from the relay station 12 while the transmission unit 34 is not transmitting a signal. The reception unit 38 outputs the transmission source identifier and the conversion signal included in the repeat signal to the control unit 30. The combination of the transmission source identifier and the conversion signal at the receiving end may be referred to as "repeat signal" in the following description.

The control unit 30 receives the repeat signal from the reception unit 38. The control unit 30 identifies the transmitting wireless device 10 by referring to the transmission source identifier included in the repeat signal. The control unit 30 outputs the conversion signal included in the repeat signal to the speech information reconstruction unit 40. The speech information reconstruction unit 40 receives the conversion signal from the control unit 30. The speech information reconstruction unit 40 converts the digital conversion signal into an analog signal and outputs the analog conversion signal (hereinafter, also referred to as "conversion signal") to the speaker 42. The speaker 42 receives the conversion signal from the speech information reconstruction unit 40. The speaker 42 converts the electric conversion signal into a speech and outputs the speech outside. In this way, the speech is received.

(3) Covered/not Covered Determination Process

The GPS signal reception processing unit 46 receives a signal from a GPS satellite (not shown) via the GPS antenna 44. The GPS signal reception processing unit 46 outputs the received signal to the positional information acquisition unit 48. The positional information acquisition unit 48 receives the signal from the GPS signal reception processing unit 46. The positional information acquisition unit 48 acquires the positional information indicating the position of the host wireless device 10 by referring to the input signal. A publicly known technology may be used for acquisition of the positional information so that a description thereof is omitted. Technologies other than GPS may be used for acquisition of the positional information. The positional information acquisition unit 48 outputs the positional information to the control unit 30.

The recording medium 50 stores communication area information indicating the range of the communication area 200 formed by the relay station 12. A plurality of relay stations 12 are provided so that a plurality of communication areas 200 corresponding to the respective relay stations 12 are indicated in the communication area information. The communication area 200 may be represented by a plurality of combinations of latitude and longitude to indicate the range. Alternatively, a circular form may be assumed so that the communication area 200 may be represented by the positional information on the relay station 12 and the radius of the communication area 200. In the latter case, the communication area 200 may only comprise the positional information on the relay station 12 given that the radius of the communication area 200 is fixed. The communication area information acquisition unit 52 acquires the communication area information from the recording medium 50.

When the transmission instruction information acquisition unit 22 acquires the transmission instruction information, the control unit 30 determines to perform a continuous transmission process or an intermittent transmission process by referring to the positional information acquired in the positional information acquisition unit 48 and the communication area information acquired in the communication area information acquisition unit 52. A continuous transmission process is a continuous process of transmission performed by the transmission unit 34.

Figure 4:
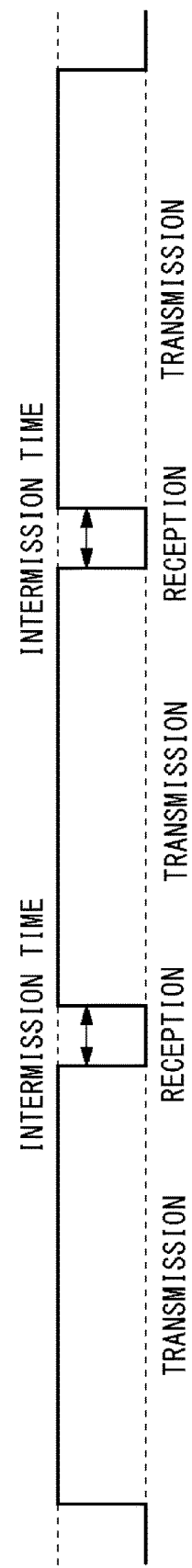
FIG. 4 shows a summary of intermittent transmission in the wireless device of FIG. 2.

An intermittent transmission process is a communication process that alternately switches between transmission by the transmission unit 34 and reception by the reception unit 38. FIG. 4 shows a summary of intermittent transmission in the wireless device 10. As shown in the figure, transmission and reception are repeated in intermittent transmission, one being switched to the other. Further, a period for reception is defined as an intermission time. Reference is made back to FIG. 2.

The process in the control unit 30 will now be described in further details. The control unit 30 identifies the communication area 200 in which the host wireless device 10 is located by referring to the communication area associated with the acquired positional information. The control unit 30 derives the first boundary line 202 by reducing the communication area 200 in size toward the center. If the positional information indicates a location inside the first boundary line 202, the control unit 30 determines to perform a continuous transmission process. In other words, if the positional information indicates a location in a zone provided inside the communication area 200, the control unit 30 determines to perform a continuous transmission process. Meanwhile, if the positional information indicates a location outside the first boundary line 202, the control unit 30 determines to perform an intermittent transmission process. In other words, if the positional information indicates a location outside a zone provided inside the communication area 200, the control unit 30 determines to perform an intermittent transmission process. In an intermittent transmission process, an intermission time for reception by the reception unit 38 is provided when transmission by the transmission unit 34 lasts 5 seconds.

If the control unit 30 determines to perform a continuous transmission process, the control unit 30 causes the transmission unit 34 to perform a transmission process while the control unit 30 is receiving the transmission instruction information from the transmission instruction information acquisition unit 22. If the control unit 30 determines to perform an intermittent transmission process, the control unit 30 causes the transmission unit 34 to perform a transmission process for 5 seconds while the control unit 30 is receiving the transmission instruction information from the transmission instruction information acquisition unit 22. When the transmission process for 5 seconds is completed, the control unit 30 causes the reception unit 38 to perform a standby operation during the intermission time (maximum of 1 second). In association with the switching from the transmission unit 34 to the reception unit 38, the frequency setting unit 32 switches the frequency. If the reception unit 38 receives a repeat signal during the intermission time and the transmission source identifier included in the repeat signal is the identifier of the host wireless device 10, the control unit 30 determines that the host wireless device 10 is located in the communication enabled area of the relay station 12. This is equivalent to determining that the host wireless device 10 is located in (covered by) the coverage area. If the host wireless device 10 is located inside the coverage area, the control unit 30 causes the transmission unit 34 to perform a transmission process for 5 seconds to repeat the aforementioned process. If the control unit 30 no longer receives the transmission instruction information from the transmission instruction information acquisition unit 22, the control unit 30 makes a transition to the aforementioned reception process.

Meanwhile, if the reception unit 38 does not receive a repeat signal during the intermission time or the transmission source identifier included in the repeat signal is not the identifier of the host wireless device 10, the control unit 30 determines that the host wireless device 10 is located outside the communication enabled area of the relay station 12. This is equivalent to determining that the host wireless device 10 is located outside (not covered by) the coverage area. In essence, the control unit 30 determines that the host wireless device 10 is located outside the communication area of the relay station 12 if the reception unit 38 does not receive a signal including the identifier of the host wireless device 10 during a predetermined period of time since the switching from transmission by the transmission unit 34 to reception by the reception unit 38 took place. If the host wireless device 10 is located outside the coverage area, the control unit 30 suspends transmission by the transmission unit 34. In this process, the control unit 30 may start roaming. If the device is located outside the coverage area, the control unit 30 may also cause the display unit 54 to display the detail of "not-covered" determination.

The features are implemented in hardware such as a CPU, a memory, or other LSI's of an arbitrary computer, and in software such as a program loaded into a memory, etc. The figure depicts functional blocks implemented by the cooperation of these elements. Therefore, it will be obvious to those skilled in the art that the functional blocks may be implemented in a variety of manners by hardware only, software only, or by a combination of hardware and software.

Figure 5:
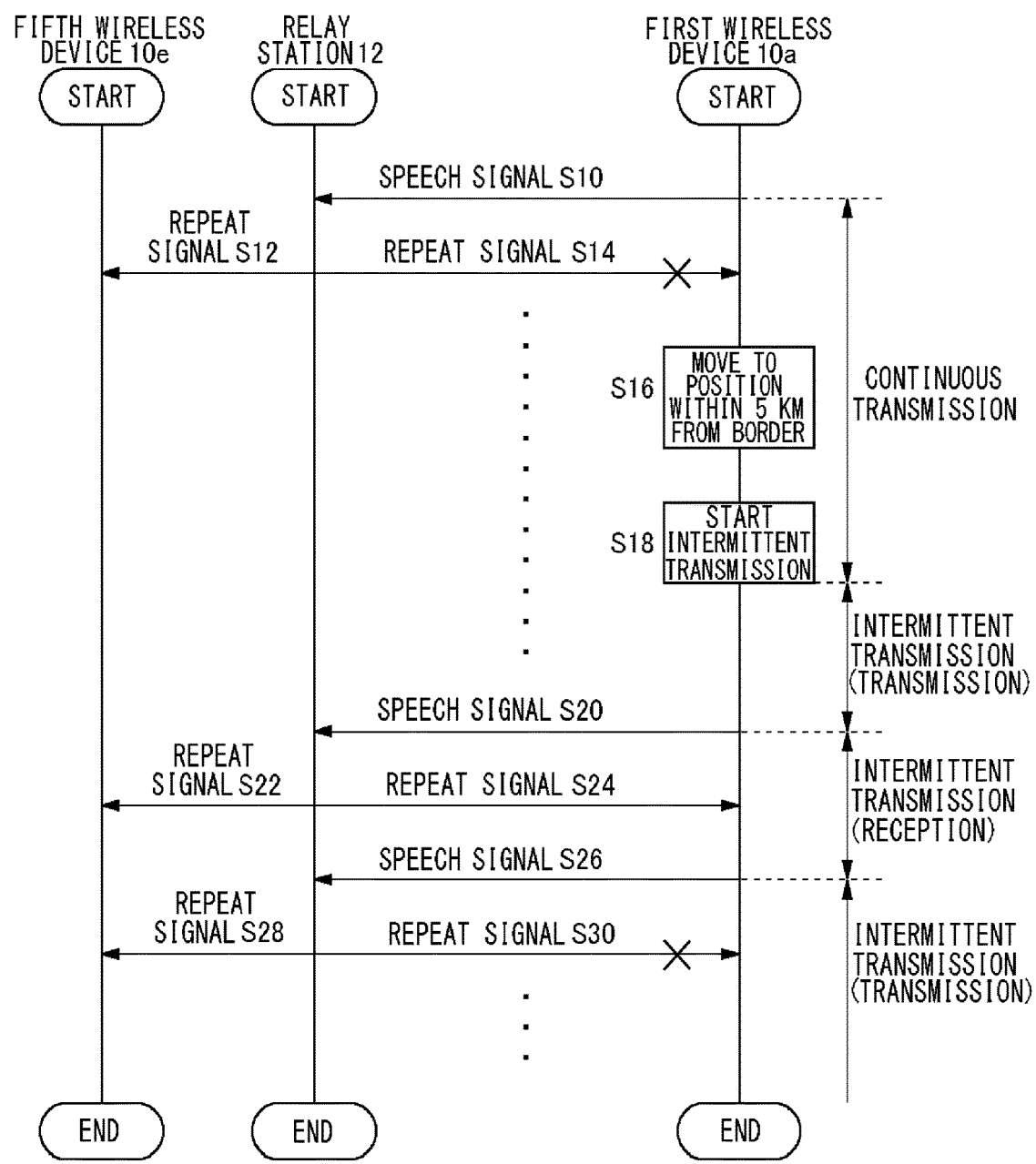
FIG. 5 is a sequence diagram showing the steps of communication in the communication system of FIG. 1.

A description will now be given of the operation of the communication system 100 with the above features. FIG. 5 is a sequence diagram showing the steps of communication in the communication system 100. The diagram shows the operation performed when the first wireless device 10a inside the first boundary line 202 moves outside. The first wireless device 10a transmits a speech signal to the relay station 12 (S10). The relay station 12 transmits a repeat signal based on the received speech signal to the fifth wireless device 10e (S12) and also to the first wireless device 10a. The first wireless device 10a is transmitting a signal and so does not receive the repeat signal (S14). The first wireless device 10a moves to a position within 5 km from the border during continuous transmission (S16). By setting a transmission time of 5 seconds, the first wireless device 10a starts intermittent transmission (S18).

The first wireless device 10a transmits a speech signal for 5 seconds (S20). The relay station 12 transmits a repeat signal based on the received signal to the fifth wireless device 10e (S22) and also to the first wireless device 10a. The first wireless device 10a receives the repeat signal including the transmission source identifier of the first wireless device 10a (S24). Upon receiving the repeat signal including the transmission source identifier of the first wireless device 10a, the first wireless device 10a switches from reception to transmission and transmits a speech signal to the relay station 12 (S26). The relay station 12 transmits a repeat signal based on the received speech signal to the fifth wireless device 10e (S28) and also to the first wireless device 10a. However, the first wireless device 10a is transmitting a signal and so does not receive the repeat signal (S30).

Figure 6:
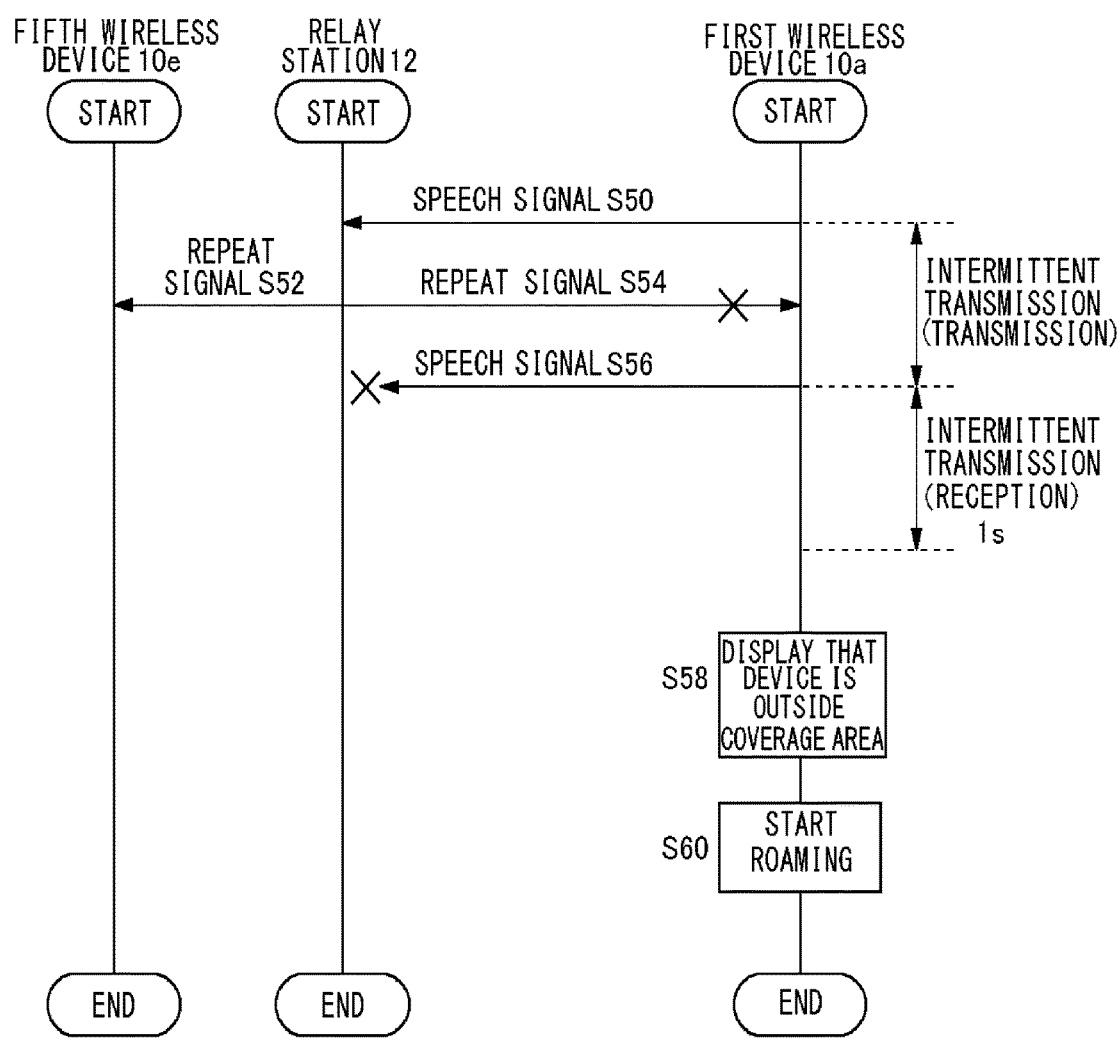
FIG. 6 is a sequence diagram showing the alternative steps of communication in the communication system of FIG. 1.

FIG. 6 is a sequence diagram showing the alternative steps of communication in the communication system 100. The diagram shows the operation performed when the first wireless device 10a moves out of the communication area 200 while the first wireless device 10a is performing an intermittent transmission process. The first wireless device 10a starts intermittent transmission to transmit a speech signal (S50). The relay station 12 transmits a repeat signal based on the received speech signal to the fifth wireless device 10e (S52) and also to the first wireless device 10a. The first wireless device 10a is transmitting a signal and so does not receive the repeat signal (S54). The first wireless device 10a may transmit a speech signal while moving out of the coverage area but the signal is not received by the relay station 12 (S56). However, the first wireless device 10a does not recognize the situation. Because a repeat signal is not received in the intermission time of 1 second, the first wireless device 10a determines that the device is outside the coverage area and the display unit 54 displays that the device is outside the coverage area (S58). The first wireless device 10a start roaming (S60).

Figure 7:
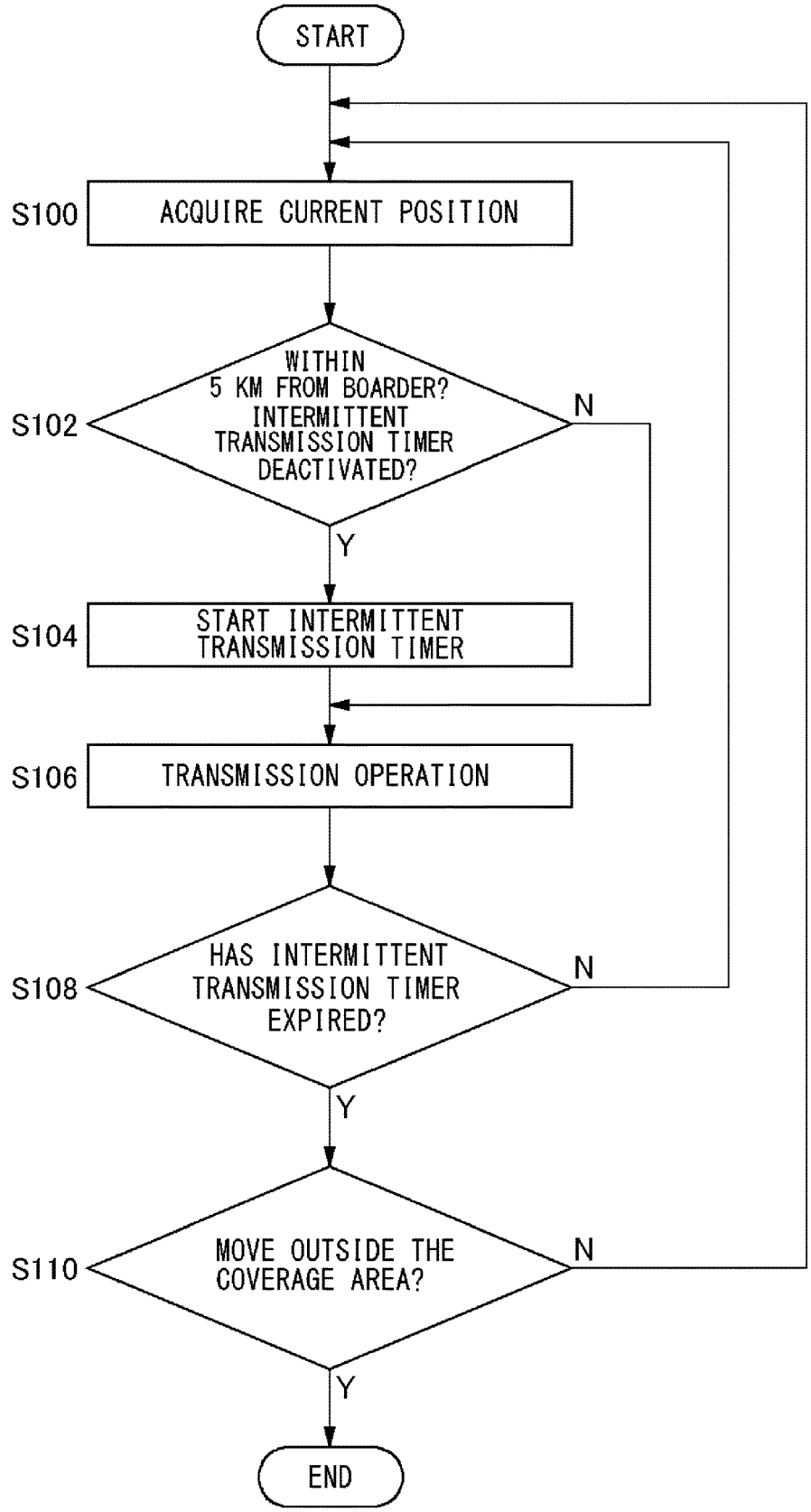
FIG. 7 is a flowchart showing the steps of communication in the wireless device of FIG. 2.

FIG. 7 is a flowchart showing the steps of communication in the wireless device 10. The positional information acquisition unit 48 acquires the positional information on the current position (S100). If the device is located within 5 km from the boarder of the coverage area and if an intermittent transmission timer is inactivated (Y in S102), the control unit 30 sets the intermittent transmission timer to 5 seconds and starts the timer (S104). If the condition in step 102 is not met (N in S102), step 104 is skipped. The control unit 30 causes the transmission unit 34 to perform a transmission operation (S106). If the intermittent transmission timer has not expired (N in S108), control is returned to step 100. If the intermittent transmission time started in step 104 has expired due to an elapse of 5 seconds (Y in S108), control is returned to step 100 provided that the device has not moved out of the coverage area (N in S110). If the device moves out of the coverage area (Y in S110), the process is terminated.

Figure 8:
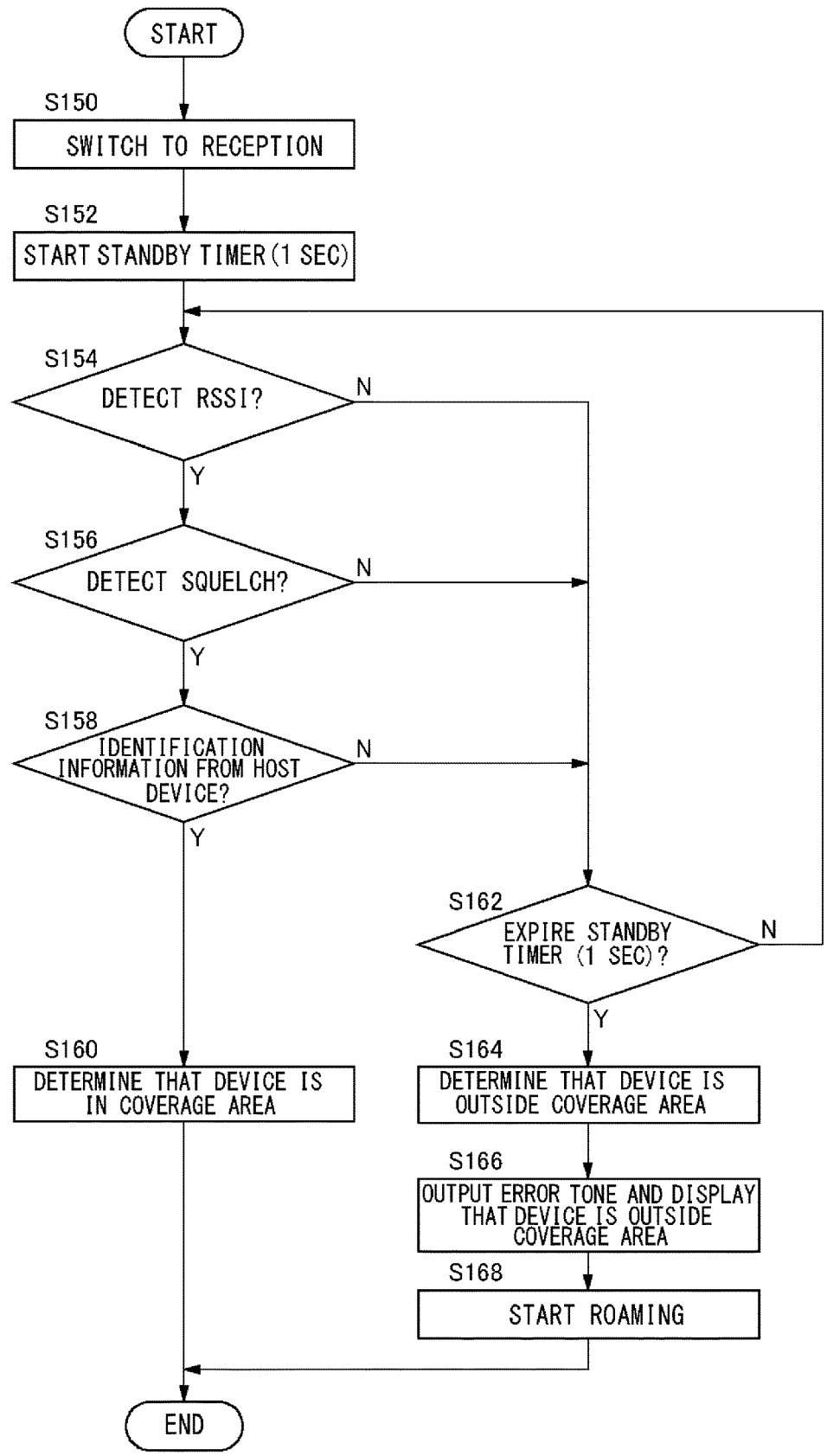
FIG. 8 is a flowchart showing the steps for covered/uncovered determination by the wireless device of FIG. 2.

FIG. 8 is a flowchart showing the steps for covered/uncovered determination by the wireless device 10. The flowchart shows the steps performed between step 108 and step 110 of FIG. 7. The control unit 30 switches to the reception unit 38 (S150). The control unit 30 starts a standby timer (1 second) (S152). If the reception unit 38 detects RSSI (Y in S154) and detects a squelch (Y in S156), the control unit 30 determines that the device is in the coverage area (S160) provided that the identifier from the host wireless device is received (Y in S158). If the reception unit 38 does not detect RSSI (N in S154), or does not detects a squelch (N in S156), or does not receive the identifier from the host wireless device (N in S158), and if the standby timer (1 second) has expired (Y in S162), the control unit 30 determines that the device is outside the coverage rea (S164). The display unit 54 outputs an error tone and displays that the device is outside the coverage area (S166). The control unit 30 starts roaming (S168). If the standby timer (1 second) has not expired (N in S162), control is returned to step 154. The determination in step 110 of FIG. 7 is made based on the result in step 160 or step 164.

According to this embodiment a determination is made as to whether a continuous transmission process is performed or an intermittent transmission process is performed based on the positional information and the communication area information. Therefore, a reception process can be performed based on the probability of the wireless device not being able to communicate actually, i.e., based on the necessity of the reception process. Since an intermittent transmission process is performed, reception can be performed even while a signal is being transmitted using the half-duplex communication scheme. Since a continuous transmission process is performed when the positional information indicates a location in a zone provided inside the communication area indicated by the communication area information, PTT-based transmission can be performed normally. Since an intermittent communication process is performed when the positional information indicates a location outside a zone provided inside the communication area indicated by the communication area information, a repeat signal can be received.

If the repeat signal is not received during an intermission time, it is determined that the host communication device is located outside the communication enabled area. Therefore, it is recognized that the device is outside the coverage area even if the device is transmitting a signal. Since the transmission is suspended if it is determined that the host communication device is located outside the communication enabled area, wasteful transmission is prevented. Since the transmission is suspended if it is determined that the host communication device is located outside the communication enabled area, roaming can be started. If it is determined that the host communication device is located outside the communication enabled area, the detail of the determination is displayed on the display unit so that the user can know that the device is outside the coverage area. Since a determination is made as to whether the transmission source identifier of the host communication device is included in the repeat signal received immediately after the transmission, and, if the identifier is not included, i.e., if the speech signal transmitted by the host communication device is not received by the relay station 12, it is determined that the host communication is located outside the communication enabled area. Accordingly, a precise determination can be made.

Embodiment 2

A description will now be given of Embodiment 2. Like Embodiment 1, Embodiment 2 also relates to a wireless device of half duplex communication scheme adapted to communicate a speech using PTT. The wireless device according to Embodiment 1 switches from a continuous transmission process to an intermittent transmission process if the device inside the first boundary line moves outside while the PTT button is being pressed. The wireless device according to Embodiment 2 performs a similar process but uses the second boundary line and the third boundary line as well as the first boundary line. The communication system 100 and the wireless device 10 according to Embodiment 2 are of the same type as shown in FIGS. 1 and 2. The following description concerns a difference from the description above.

In (3) the covered/uncovered determination process, the control unit 30 identifies the communication area 200 in which the host wireless device 10 is located by referring to the communication area information associated with the acquired positional information. The control unit 30 derives the first boundary line 202, the second boundary line 204, and the third boundary line 206 by reducing the communication area 200 in size toward the center. The relationship between the first boundary line 202, the second boundary line 204, and the third boundary line 206 is as described above. If the position information indicates a position inside the first boundary line 202, the control unit 30 determines to perform a continuous transmission process. If the position information indicates a position in a zone sandwiched by the first boundary line 202 and the second boundary line 204, the control unit 30 determines to perform an intermittent transmission process in which an intermission time for reception by the reception unit 38 is provided following "5" seconds of transmission by the transmission unit 34.

If the position information indicates a position in a zone sandwiched by the second boundary line 204 and the third boundary line 206, the control unit 30 determines to perform an intermittent transmission process in which an intermission time for reception by the reception unit 38 is provided following "3" seconds of transmission by the transmission unit 34. If the position information indicates a position in a zone sandwiched by the third boundary line 206 and the communication area 200, the control unit 30 determines to perform an intermittent transmission process in which an intermission time for reception by the reception unit 38 is provided following "1" second of transmission by the transmission unit 34. Thus, if the control unit 30 determines to perform an intermittent transmission process, the control unit 30 determines a time interval elapsed before switching to reception by the reception unit 38 in accordance with the closeness of the positional information to the border of the communication area 200.

Figure 9:
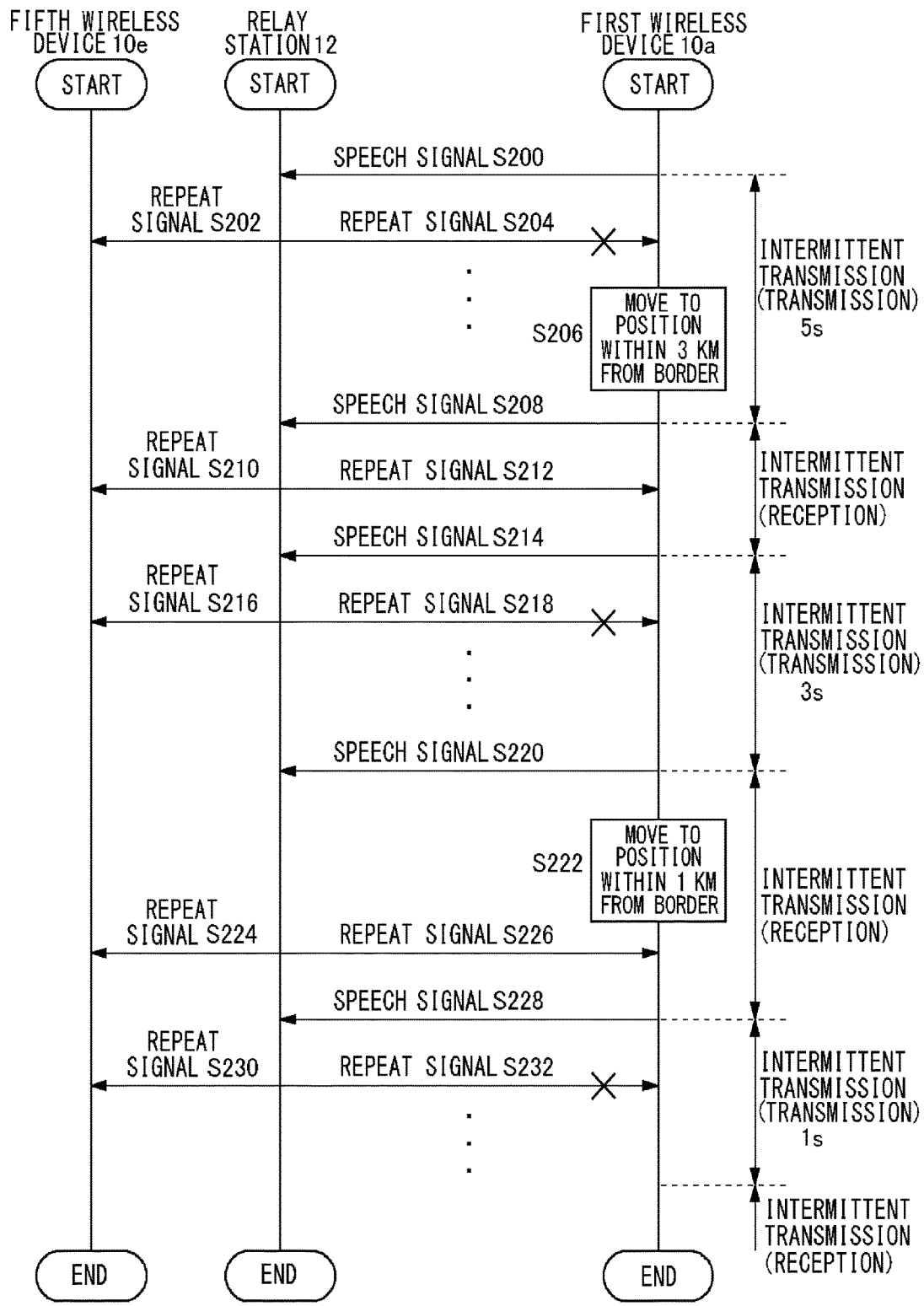
FIG. 9 is a sequence diagram showing the steps of communication in the communication system according to Embodiment 2.

A description will be given of the operation of the communication system 100 with the above features. FIG. 9 is a sequence diagram showing the steps of communication in the communication system 100 according to Embodiment 2. The diagram shows the operation performed when the first wireless device 10a outside the first boundary line 202 moves outward, crossing the second boundary line 204 and the third boundary line 206. By setting a transmission time of 5 seconds, the first wireless device 10a starts intermittent transmission and transmits a speech signal to the relay station 12 (S200). The relay station 12 transmits a repeat signal based on the received speech signal to the fifth wireless device 10e (S202) and also to the first wireless device 10a. However, the first wireless device 10a is transmitting a signal and so does not receive the repeat signal (S204). The first wireless device 10a moves to a position within 3 km from the boarder during intermittent transmission (S206). The first wireless device 10a transmits a speech signal to the relay station 12 (S208).

The relay station 12 transmits a repeat signal based on the received signal to the fifth wireless device 10e (S210) and also to the first wireless device 10a. The first wireless device 10a receives the repeat signal including the transmission source identifier of the first wireless device 10a (S212). Upon receiving the repeat signal including the transmission source identifier of the first wireless device 10a, the first wireless device 10a switches from reception to transmission. By setting a transmission time of 3 seconds, the first wireless device 10a starts intermittent transmission and transmits a speech signal to the relay station 12 (S214). The relay station 12 transmits a repeat signal based on the received speech signal to the fifth wireless device 10e (S216) and also to the first wireless device 10a. The first wireless device 10a is transmitting a signal and so does not receive the repeat signal (S218).

The first wireless device 10a transmits a speech signal to the relay station 12 (S220). The first wireless device 10a moves to a position within 1 km from the border during intermittent transmission (S222). The relay station 12 transmits a repeat signal based on the received signal to the fifth wireless device 10e (S224) and also to the first wireless device 10a. The first wireless device 10a receives the repeat signal including the transmission source identifier of the first wireless device 10a (S226). Upon receiving the repeat signal including the transmission source identifier of the first wireless device 10a, the first wireless device 10a switches from reception to transmission. By setting a transmission time of 1 second, the first wireless device 10a starts intermittent transmission and transmits a speech signal to the relay station 12 (S228). The relay station 12 transmits a repeat signal based on the received speech signal to the fifth wireless device 10e (S230) and also to the first wireless device 10a. However, the first wireless device 10a is transmitting a signal and so does not receive the repeat signal (S232).

Figure 10:
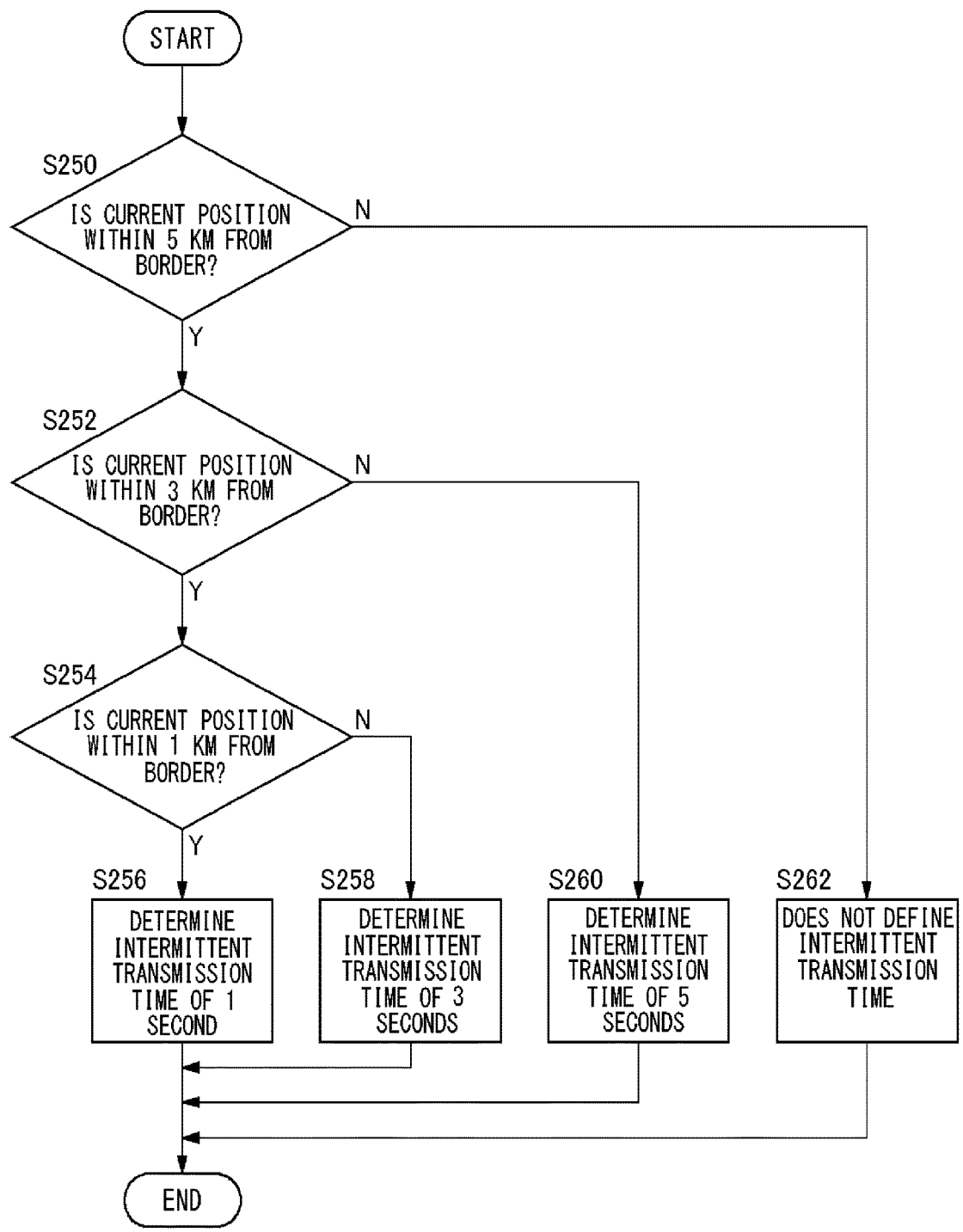
FIG. 10 is a flowchart showing the steps of determining an intermittent transmission time by the wireless device according to Embodiment 2.

FIG. 10 is a flowchart showing the steps of determining an intermittent transmission time by the wireless device 10 according to Embodiment 2. If the current position is within 5 km from the boarder (Y in S250), the current position is within 3 km from the boarder (Y in S252), and the current position is within 1 km from the border (Y in S254), the control unit 30 determines an intermittent transmission time of 1 second (S256). If the current position is not within 1 km from the border (N in S254), the control unit 30 determines an intermittent transmission time of 3 seconds (S258). If the current position is not within 3 km from the border (N in S252), the control unit 30 determines an intermittent transmission time of 5 seconds (S260). If the current position is not within 5 km from the border (N in S250), the control unit 30 does not define an intermittent transmission time (S262). The intermittent transmission time determined in step 256, step 258, and step 260 is set in the intermittent transmission time in step 104 of FIG. 7 and the intermittent transmission timer is started accordingly.

According to this embodiment, the time interval elapsed before switching to reception is determined in accordance with the closeness of the positional information to the border of the communication area indicated by the communication area information, i.e., based on the probability of the wireless device not being able to communicate actually. Therefore, the intermittent transmission time is determined in accordance with the necessity of the reception process. The closer to the border of the communication area, the shorter the intermittent transmission time so that opportunities for reception of a repeat signal are increased. Since opportunities for reception of a repeat signal are increased, it will be easy to determine that the device is outside the coverage area. Where there is a high probability that the wireless device cannot communicate actually, the embodiment makes it possible to determine that communication is actually disabled in a short period of time and let the user know it in a short period of time. Since the intermittent transmission time is extended as the device approaches the border of the communication area, opportunities for transmission are increased.

Embodiment 3

A description will now be given of Example 3. Like the foregoing embodiments, Embodiment 3 also relates to a wireless device of half duplex communication scheme adapted to communicate a speech using PTT. The wireless device according to Embodiment 1 switches from a continuous transmission process to an intermittent transmission process if the device inside the first boundary line moves outside while the PTT button is being pressed. Meanwhile, the wireless device according to Embodiment 3 switches from an intermittent transmission process to a continuous transmission process if the device outside the first boundary line moves inside while the PTT button is being pressed. The communication system 100 and the wireless device 10 according to Embodiment 3 are of the same type as shown in FIGS. 1 and 2. The following description concerns a difference from the description above.

Figure 11:
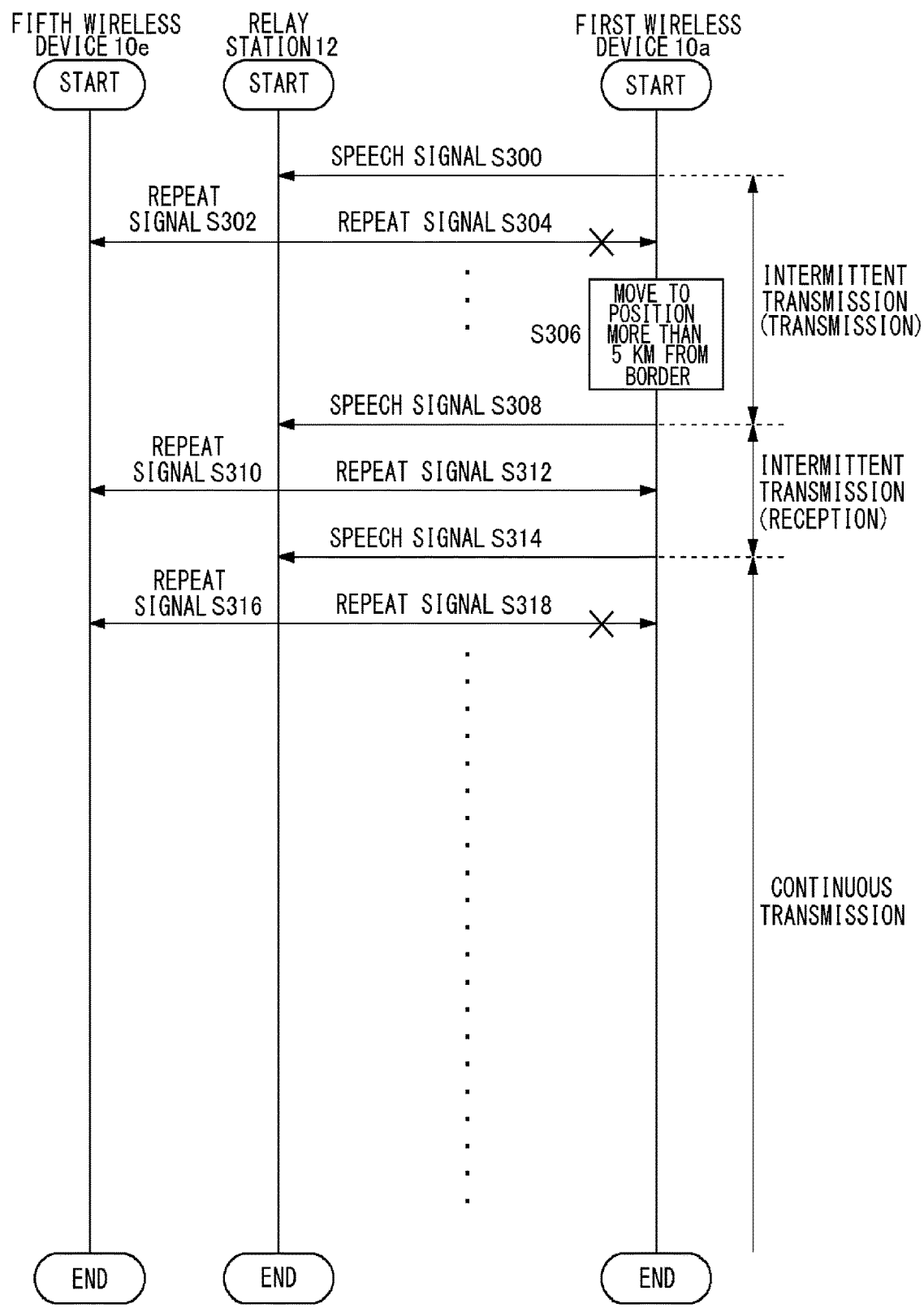
FIG. 11 is a sequence diagram showing the steps of communication in the communication system according to Embodiment 3.

FIG. 11 is a sequence diagram showing the steps of communication in the communication system 100 according to Embodiment 3. The diagram shows a case in which the device starts transmission outside the first boundary line 202 and moves inside the first boundary line 202 during transmission. The first wireless device 10*a* starts intermittent transmission to transmit a speech signal (S300). The relay station 12 transmits a repeat signal based on the received speech signal to the fifth wireless device 10*e* (S302) and also to the first wireless device 10*a*. However, the first wireless device 10*a* is transmitting a signal and so does not receive the repeat signal (S304). The first wireless device 10*a* moves from to a position more than 5 km from the border during intermittent transmission (S306).

The first wireless device 10*a* transmits a speech signal to the relay station 12 (S308). The relay station 12 transmits a repeat signal based on the received signal to the fifth wireless device 10*e* (S310) and also to the first wireless device 10*a*. The first wireless device 10*a* receives the repeat signal including the transmission source identifier of the first wireless device 10*a* (S312). Upon receiving the repeat signal including the transmission source identifier of the first wireless device 10*a*, the first wireless device 10*a* switches from reception to transmission. The first wireless device 10*a* transmits a speech signal in continuous transmission (S314). The relay station 12 transmits a repeat signal based on the received speech signal to the fifth wireless device 10*e* (S316) and also to the first wireless device 10*a*. The first wireless device 10*a* is transmitting a signal and so does not receive the repeat signal (S318).

According to this embodiment, an intermittent transmission process is switched to a continuous transmission process as the device approaches the center of the communication area so that PTT-based transmission can be performed normally.

Described above is an explanation based on an exemplary embodiment. The embodiment is intended to be illustrative only and it will be obvious to those skilled in the art that various modifications to constituting elements and processes could be developed and that such modifications are also within the scope of the present invention.

Instead of causing the control unit 30 of the first wireless device 10*a* to derive the first boundary line 202, the second boundary line 204, and the third boundary line 206 based on the communication area information, the communication area information may include information related to the first boundary line 202, the second boundary line 204, and the third boundary line 206. In other words, the communication area information may indicate the probability of communication being enabled at respective positions as well as indicating an estimated communication enabled area. The first wireless device 10*a* may determine whether to perform an intermittent transmission process and determine a time interval elapsed before switching to reception in an intermittent transmission process, based on the positional information acquired in the positional information acquisition unit 48 and the magnitude of probability that communication is enabled at the respective positions.

The communication area 200 indicated by the communication area information may be represented by a plurality of combinations of latitude, longitude, and altitude. Further, the positional information acquired by the positional information acquisition unit 48 may include altitude in addition to latitude and longitude, and the above-described embodiments may be practiced by using the altitude in addition.

For example, a plurality of sets of communication areas 200 indicated by the communication area information may be presented for respective time zones (e.g., for a.m. and for p.m.). The first wireless device 10*a* may switch the communication area 200 used depending on the current time.

For example, the communication area information acquisition unit 52 may acquire the communication area information from outside the wireless device 10 by, for example, network communication, instead of from the recording medium 50 in the wireless device 10. The communication area information may be acquired and updated at predetermined time intervals.

According to the embodiments, the communication system 100 uses business wireless communication.

Alternatively, a wireless communication system other than business wireless communication may be used. According to this variation, the flexibility of the configuration can be improved.

What is claimed is:

1. A wireless device comprising:
a positional information acquisition device that acquires positional information indicating a position of the wireless device;
a communication area information acquisition device that acquires communication area information indicating a communication area of a relay station;
a transmission device that transmits a signal to the relay station;
a reception device that receives a signal from the relay station when the transmission device does not transmit a signal; and
a control device that generates:
continuous transmission by the transmission device when the position of the wireless device indicated by the positional information is included in a zone provided inside the communication area,
communication in which transmission by the transmission device and reception by the reception device are alternately switched at predetermined intervals when the position of the wireless device indicated by the positional information is outside the zone, based on the positional information acquired in the positional information acquisition device and the communication area information acquired in the communication area information acquisition device,
wherein the control device determines whether communication is possible with the relay station based on the received signal.

2. The wireless device according to claim 1, wherein when the control device determines to perform communication in which transmission by the transmission device and reception by the reception device are alternately switched, the control device determines a time interval elapsed before switching to reception by the reception device in accordance with closeness of the position indicated by the positional information to a border of the communication area indicated in the communication area information.

3. The wireless device according to claim 1, wherein in addition to indicating the communication area, the communication area information indicates probability that communication is enabled at designated positions, and
when the control device determines to perform communication in which transmission by the transmission device and reception by the reception device are alternately switched, the control device determines a time interval elapsed before switching to reception by the reception device based on the positional information and the probability that communication is enabled at the designated positions.

4. The wireless device according to claim 1, wherein the control device determines that the wireless device is located outside an area in which communication with the relay station is enabled when the reception device fails to receive a signal transmitted by the relay station within a predetermined period of time since the switching from transmission by the transmission device to reception by the reception device.

5. The wireless device according to claim 4, wherein the control device suspends transmission by the transmission device when the control device determines that the wireless device is located outside the area in which communication with the relay station is enabled.

6. The wireless device according to claim 4, further comprising:
a display device, wherein
when the control device determines that the wireless device is located outside the area in which communication with the relay station is enabled, the control device causes the display device to display details of determination.

7. The wireless device according to claim 1, wherein the transmission device transmits a signal including an identifier for identifying the wireless device, and
the control device determines that the wireless device is located outside an area in which communication with the relay station is enabled when the reception device fails to receive a signal including the identifier within a predetermined period of time since the switching from transmission by the transmission device to reception by the reception device.

8. The wireless device according to claim 7, wherein the control device suspends transmission by the transmission device when the control device determines that the wireless device is located outside the area in which communication with the relay station is enabled.

9. The wireless device according to claim 7, further comprising:
a display device, wherein
when the control device determines that the wireless device is located outside the area in which communication with the relay station is enabled, the control device causes the display device to display details of determination.

10. A communication method in a wireless device, comprising:
acquiring positional information indicating a position of the wireless device;
acquiring communication area information indicating a communication area of a relay station;
transmitting a signal to the relay station;
receiving a signal from the relay station when the signal is not transmitted from the wireless device;
generating continuous transmission when the position of the wireless device indicated by the positional information is included in a zone provided inside the communication area;
generating communication in which transmission and reception are alternately switched at predetermined intervals when the position of the wireless device indicated by the positional information is outside the zone, based on the positional information and the communication area information; and
determining whether communication is possible with the relay station based on the received signal.

* * * * *